Patented May 23, 1950

2,509,174

UNITED STATES PATENT OFFICE 2,509,174

PROCESS OF WATERPROOFING TEXTILE FABRICS

Milton J. Scott and Stuart H. Rider, Springfield, Mass., assignors to Monsanto Chemical Company, St. Louis, Mo., a corporation of Delaware No Drawing. Application May 22, 1947, Serial No. 749,880

10 Claims. (Cl. 117—161)

This invention relates to waterproofing compositions and to materials treated therewith. More particularly, the invention relates to certain aminotriazine-aldehyde-alcohol reaction products and to cellulosic and proteinaceous materials treated therewith.

An object of this invention is to prepare waterproofing compositions.

A further object is to prepare aqueous emulsions of aminotriazine-aldehyde-alcohol reaction products.

Another object is to provide waterproof coatings.

Still another object is to provide waterproof textiles.

These and other objects are attained by preparing a liquid reaction product of an aminotriazine, an aldehyde, and two alcohols one of which is an aliphatic saturated alcohol containing 6 carbon atoms or less and the other of which is a saturated or unsaturated aliphatic alcohol containing at least 12 carbon atoms, and then treating water-receptive materials with the liquid reaction product to render them water-repellent.

The following examples are given in illustration and are not intended to limit the scope of this invention. Where parts are mentioned, they are parts by weight.

Example I 126 parts (1 mol) of melamine were mixed with 480 parts of Formalin (equivalent to about 6 mols of formaldehyde). The pH of the mixture was adjusted to about 8-9 and the mixture was then refluxed at atmospheric pressure for 30 minutes. The resultant solution of hexamethylol melamine in water was cooled to crystallize the hexamethylol melamine thus producing an aqueous slurry. The slurry was spray dried and the crystals were recovered for further reaction.

Example II 314 parts (about 1 mol) of spray dried crystalline hexamethylol melamine of Example I were mixed with 504 parts (6 mols) of anhydrous n-butanol and 0.5 part of concentrated hydrochloric acid. The mixture was refluxed for 30 minutes at atmospheric pressure and then 538 parts (2 mols) of stearyl alcohol were added and refluxing continued for 30 minutes at atmospheric pressure to obtain a clear solution. The solution was concentrated by distillation at a vacuum of 25 inches of mercury until a temperature of 130° C. was obtained. The resulting material was a mixed stearyl n-butyl ether of hexamethylol melamine containing about 2 mols of stearyl alcohol per mol of hexamethylol melamine.

Example III 314 parts of spray dried crystalline hexamethylol melamine of Example I were mixed with 320 parts (10 mols) of anhydrous methanol and 0.5 part of ethyl phosphoric acid. The mixture was refluxed for 30 minutes at atmospheric pressure and then 404 (1.5 mols) parts of stearyl alcohol were added and refluxing continued for 30 minutes. The solution was concentrated by vacuum distillation at about 25 inches of mercury until the temperature rose to about 130° C. The resulting material was a methyl stearyl ether of hexamethylol melamine containing about 1.5 mols of stearyl alcohol per mol of hexamethylol melamine.

Example IV

Example III was repeated except that about 1.5 mols of cetyl alcohol were substituted for the stearyl alcohol. A methyl cetyl ether of hexamethylol melamine was obtained.

In making the mixed ethers of alkylol aminotriazines, each of the components may be replaced by analogous materials and the amounts of the components may be varied over a wide range.

Instead of melamine shown in Example I other aminotriazines may be used. Typical examples of aminotriazines are: melamine, formoguanamine, melam, melem, aminotriazines in which 1 or 2 amino groups are substituted by hydroxy, halogen, alkyl, aryl or aralkyl groups such as 2-hydroxy-4, 6-diamino-1,3,5-triazine, 2,4-dihydroxy-6-amino-1,3,5-triazine, 2 - chloro-4,6-diamino-1,3,5-triazine, 2 - phenyl - 4,6 - diamino-1,3,5-triazine, 6-methyl-2,4-diamino - 1,3,5 - triazine, aminotriazines in which the hydrogen atoms of the amino groups are partially substituted by amino, alkyl, aryl, or aralkyl groups such as 2,4,6-trihydrazino-1,3,5-triazine, mono-, di-, or trialkyl melamines, e. g., 2,4,6-triethyl-triamino-1,3,5-triazine, mono-, di-, or triaralkyl melamines, mono-, di-, or triaryl melamines, e. g., 2,4,6-triphenyl-triamino-1,3,5-triazine, etc. Mixtures of two or more of the above may also be employed.

The formaldehyde shown in Example I may be replaced in whole or in part by saturated or unsaturated aliphatic, alicyclic or aromatic aldehydes. Typical examples of aldehydes which may be used are: formaldehyde, acetaldehyde, propionaldehyde, butyraldehyde, hexaldehyde, octaldehyde, benzaldehyde, furfural, acrolein, methacrolein, crotonaldehyde, cinnamaldehyde, etc. For economic considerations, under present day conditions, the lower aliphatic aldehydes, especially formaldehyde, constitute a preferred class for use in making the resins of this invention. The aldehydes may be used in proportions ranging from 1 to 6 or more mols per mol of aminotriazine.

The preliminary reaction to produce the alkylol aminotriazine as typified by Example I is carried out preferably under alkaline conditions, i. e., a pH of 8–10 under refluxing conditions at atmospheric pressure. In the preferred embodiment of this invention the reaction under reflux is stopped by cooling as soon as a clear solution is obtained. The alkylol aminotriazine is then crystallized and freed from water and excess aldehyde. It is, however, within the scope of this invention to add the alcohols and etherification catalysts to the water solution of the alkylol melamine and then carrying out the etherification step in an aqueous medium.

In the second step of this invention, as illustrated in Examples II, III and IV, the n-butanol and methanol may be replaced in whole or in part by other saturated aliphatic alcohols containing 6 carbon atoms or less, e. g., ethanol, propanol, isopropanol, isobutanol, pentanols, hexanols, etc. To obtain the best results, the lower alcohol should be a straight chain alcohol but branched chain alcohols such as isopropanol or isobutanol may be used to obtain specific properties in the final resin. The amount of saturated aliphatic alcohol to be used will depend on the process used and the product desired. From 1 to 6 mols of alcohol are used in the reaction with the alkylol aminotriazine and it is convenient to use a substantial excess of alcohol to act as a solvent for the resins produced. An excess of alcohol is particularly desirable if the substantially anhydrous process shown in Examples II, III and IV is used. If desired, the solvent may be removed by vacuum distillation to obtain the pure liquid resin.

The stearyl and cetyl alcohols shown in Examples II, III and IV may be replaced in whole or in part by other saturated or unsaturated aliphatic alcohols containing at least 12 carbon atoms and preferably not more than 35 carbon atoms, e. g., carnaubyl alcohol, heptadecanol, nondecanol, eicosanol, melissic alcohol, etc. The long chain alcohols which may be either straight or branched chain compounds, may be used in proportions ranging from 1 to 4 mols of alcohol per mol of alkylol aminotriazine. They partially replace the lower alcohols on the alkylol aminotriazine, thus releasing the lower alcohols to act as solvents for the reaction product. The waterproofing properties of the new resins are attained as soon as from about 1 to about 2 mols of higher alcohol have reacted with 1 mol of the alkylol aminotriazine. If from 2 to 4 mols of the higher alcohol react with 1 mol of aminotriazine-aldehyde reaction product, the waterproofing properties of the product are very slightly increased over a resin containing only 1 to 2 mols of higher alcohol.

In the preferred embodiment of this invention, water-free crystalline hexamethylol melamine made as shown in Example I is reacted first with an excess, i. e., more than 6 mols, of an anhydrous lower aliphatic alcohol and then with 1 to 2 mols of a higher aliphatic alcohol using an acidic condensation catalyst. The small amount of water normally associated with the catalyst is sufficient to activate the etherification reaction and does not interfere therewith.

The etherification catalysts include such acids as sulfuric, hydrochloric, acetic, phosphoric acids, etc. The acids are used in concentrated form and contain a relatively minor percentage of water.

The mixed alcohol ethers of alkylol aminotriazines are liquid resins insoluble in water and soluble in organic solvents such as alcohols, ketones, esters, toluene, benzene, mineral spirits, etc. They are water-white or slightly yellow in color. They may be used to waterproof cellulosic or proteinaceous materials such as paper, cotton, wood, wool, silk, viscose and cellulose acetate rayons, etc.

The liquid resins may be cured to an insoluble, infusible state by the application of heat at about 100 to about 300° C. for a short period without the addition of a curing catalyst. Acid curing catalysts may be used, if desired.

The mixed ethers may be applied as a waterproofing composition from a solution in organic solvents or from an aqueous emulsion.

*Example V*

70 parts of a butyl-stearyl ether of hexamethylol melamine made as shown in Example II were dissolved in 30 parts of mineral spirits and then emulsified with 100 parts of water in the presence of ammonium oleate as emulsifying agent. The resulting emulsion was an oil-in-water type emulsion containing 36% solids by weight and 15% solvent by weight.

A portion of the emulsion was diluted with water to about 10% solids (liquid resin) by weight. Cotton cloth was drawn through the dilute emulsion, partially dried by wringing and then dried for a few minutes at approximately 100° C. followed by treatment for about 20 minutes at 145–155° C. The resin pick-up was found to be between 3 and 4%. The treated cloth had substantially 100% resistance to water as measured by ASTM Test Method D583 40T using the Water Absorption (Spray) Method. After repeated launderings with soap and hot water, a sample of the treated cloth still had excellent water repellence and had not shrunk materially. Moreover, repeated treatment with dry cleaning solvents did not appreciably alter the water repellency of the treated fabric.

A further portion of the emulsion made according to Example V and diluted to about 10% solids with water was used to treat a woolen fabric in substantially the same manner and with substantially the same results.

Quite unexpectedly, it was found that even though more than the minimum amount of resin to produce water repellency was used, the hand of the fabric was as soft and in some cases softer, than the hand of the untreated fabric.

Still another portion of the emulsion prepared according to Example V was diluted with water to about 6% solids by weight. The dilute emulsion was then roll-coated on thin kraft paper. The coated paper was dried at about 100° C. and then heated at 140–160° C. for about 5 minutes. The treated paper was substantially 100% water repellent and was not noticeably stiffer than the untreated paper.

*Example VI*

An emulsion similar to that of Example V was made using the resin of Example IV. When applied to cotton and wool fabric and to paper similar results were obtained, i. e., substantially 100% water-repellency as measured by ASTM Test Method D583 40T. The water repellency of the fabric was substantially unaffected by laundering or dry cleaning. The hand of the fabric and stiffness of the paper were not substantially altered by the resin.

*Example VII*

5 parts of a butyl-stearyl ether of hexamethylol melamine made as in Example II were dissolved in 95 parts of mineral spirits. Cotton cloth was drawn through the solution, partially dried by wringing and then dried for a few minutes at approximately 100° C. The cloth was then heated to 145–155° C. for about 20 minutes. The resin pick-up was about 4%. The results obtained in water repellency tests were similar to those obtained as shown in Example V.

In the preferred embodiment of this invention, the liquid resin is emulsified with water. It is convenient, but not necessary, to thin the resin with a solvent such as mineral spirits prior to the emulsification step. Various emulsifying agents may be used such as soaps, salts of styrene-maleic anhydride copolymers, salts of aryl sulfonic acids, etc. A preferred group of emulsifying agents are ammonium or amine salts of oleic acid including ammonium oleate, morpholine oleate, ethanolamine oleate, etc. Conveniently, an emulsion containing about 35% by weight of liquid resin is prepared which can be further diluted to suit the particular requirements of the material to be waterproofed.

The resins of this invention, whether used in the form of a solution in volatile solvents, or as aqueous emulsions provide substantially 100% water repellency for the treated materials. In cases of cellulosic or proteinaceous materials, such as paper, cotton, wood, wool, silk, cellulose acetate rayons, etc., they become bonded so firmly that they cannot be removed by washing with soap and water or by cleaning with dry cleaning solvents. This property is of especial advantage for the protection of textiles which must be frequently washed or dry cleaned. A typical example of the valuable properties of textiles treated by the emulsions of this invention is the resistance of a treated white cotton cloth to a water-soluble ink. In a laboratory test, a large spot of water-soluble ink was placed on a sample of treated white cotton cloth. The stained sample was then placed in a stream of cold water and the ink vanished almost immediately, leaving no colored stain. The cloth was shaken vigorously and then was found to be substantially dry.

A further advantage of the resins of this invention is their lack of original color and their resistance to the development of color on aging. This property permits them to be used on white and delicately tinted textiles without impairing the color of the textile.

Still another advantage of these resins is that they do not change the physical characteristics of materials treated therewith, i. e., they do not increase the harshness of hand of textiles, nor the stiffness of papers.

Still another advantage is that they do not deteriorate on long aging to generate acidic type materials which tender the fabric as is the case with many other types of permanent water repellents.

An important advantage is the resistance to "mark-off" of textiles and especially nylon textiles which have been treated with the resins of this invention. "Mark-off" is the appearance of marks on a treated fabric when scratched or roughly treated. The marks are unsightly and not easily removed. Nylon and other fabrics treated with the mixed ethers of this invention do not "mark-off."

Aqueous emulsions of the resins of this invention are particularly valuable since they may be made originally with a relatively high per cent by weight of resin in which condition they may be easily diluted to relatively low resin content as desired for other uses. For example, in treating textiles, the emulsion may be diluted until it contains from about 1% to about 6% by weight of resin to regulate the subsequent resin pickup of the fabric within desired limits, i. e., generally 2 to 6% by weight based on the weight of the fabric.

It is obvious that many variations and alterations may be made in the products and processes of this invention without departing from the spirit and scope of this invention as set forth in the appended claims.

What is claimed is:

1. A process for waterproofing textile fabrics which comprises impregnating said fabrics with an aqueous emulsion of a mixed ether comprising an aminotriazine condensation product etherified with (1) from 5–2 mols of a saturated unsubstituted monohydric aliphatic alcohol containing from 1–6 carbon atoms and (2) from 1–4 mols of an alcohol taken from the group consisting of unsubstituted monohydric saturated and unsaturated aliphatic alcohols containing from 12–30 carbon atoms, and thereafter heating the impregnated fabric at from 100° C. to 300° C.

2. A process as in claim 1 wherein the 1–6 carbon atom alcohol is n-butanol.

3. A process as in claim 1 wherein the 1–6 carbon atom alcohol is methanol.

4. A process as in claim 1 wherein the 1–6 carbon atom alcohol is methanol and the 12–30 carbon atom alcohol is stearyl alcohol.

5. A process as in claim 1 wherein the 1–6 carbon atom alcohol is n-butanol and the 12–30 carbon atom alcohol is stearyl alcohol.

6. A process as in claim 1 wherein the 1–6 carbon atom alcohol is n-butanol and the 12–30 carbon atom alcohol is cetyl alcohol.

7. A process for waterproofing textile fabrics which comprises impregnating said fabrics with an aqueous emulsion of a mixed ether comprising 1 mol of hexamethylol melamine etherified with from 5–2 mols of methanol and from 1–4 mols of stearyl alcohol, and thereafter heating the impregnated fabrics at temperatures of from 100° C. to 300° C.

8. A process for waterproofing textile fabrics which comprises impregnating said fabrics with an aqueous emulsion of a mixed ether comprising 1 mol of hexamethylol melamine etherified with from 5–2 mols of n-butanol and from 1–4 mols of stearyl alcohol, and thereafter heating the impregnated fabrics at temperatures of from 100° C. to 300° C.

9. A process for waterproofing textile fabrics which comprises impregnating said fabrics with an aqueous emulsion of a mixed ether comprising 1 mol of hexamethylol melamine etherified with from 5–2 mols of n-butanol and from 1–4 mols of cetyl alcohol, and thereafter heating the impregnated fabrics at temperatures of from 100° C. to 300° C.

10. A process for waterproofing textile fabrics which comprises impregnating said fabrics with from 2-6% by weight, based on the weight of the fabric, of a mixed ether comprising 1 mol of an aminotriazine-aldehyde condensation product etherified with (1) from 5-2 mols of saturated unsubstituted monohydric alcohol containing from 1-6 carbon atoms and (2) from 1-4 mols of an alcohol taken from the group consisting of unsubstituted monohydric saturated and unsaturated aliphatic alcohols containing from 12-30 carbon atoms, said mixed ether being deposited on the fabrics from aqueous emulsion, and thereafter heating the impregnated fabrics at 100° C. to 300° C.

MILTON J. SCOTT.
STUART H. RIDER.

REFERENCES CITED

The following references are of record in the file of this patent:

UNITED STATES PATENTS

| Number    | Name      | Date           |
|-----------|-----------|----------------|
| 2,197,357 | Widmer    | Apr. 16, 1940  |
| 2,329,622 | Johnstone | Sept. 14, 1943 |
| 2,357,273 | Thurston  | Aug. 29, 1944  |
| 2,371,892 | Hood      | Mar. 20, 1945  |
| 2,420,157 | West      | May 6, 1947    |
| 2,426,770 | Grim      | Sept. 2, 1947  |